(12) United States Patent
Komatsu et al.

(10) Patent No.: US 11,715,827 B2
(45) Date of Patent: Aug. 1, 2023

(54) ANODE INTERLAYER FOR LITHIUM BATTERIES

(71) Applicants: Nissan North America, Inc., Franklin, TN (US); United States of America as Represented by the Administrator of NASA, Washington, DC (US)

(72) Inventors: Hideyuki Komatsu, Yokosuka (JP); Shigemasa Kuwata, Palo Alto, CA (US); Atsushi Ohma, Kanagawa (JP); Maarten Sierhuis, San Francisco, CA (US); Xin Yang, Palo Alto, CA (US); Najamuddin Mirza Baig, San Jose, CA (US); Balachandran Gadaguntla Radhakrishnan, San Mateo, CA (US); Shreyas Honrao, Sunnyvale, CA (US); John Lawson, San Francisco, CA (US); Mohit Rakesh Mehta, Santa Clara, CA (US)

(73) Assignee: Nissan North America, Inc., Franklin, TN (US)

( * ) Notice: Subject to any disclaimer, the term of this patent is extended or adjusted under 35 U.S.C. 154(b) by 83 days.

(21) Appl. No.: 17/169,962

(22) Filed: Feb. 8, 2021

(65) Prior Publication Data
US 2022/0255078 A1 Aug. 11, 2022

(51) Int. Cl.
*H01M 4/58* (2010.01)
*H01M 10/0525* (2010.01)
(Continued)

(52) U.S. Cl.
CPC ........... *H01M 4/582* (2013.01); *H01M 4/382* (2013.01); *H01M 4/485* (2013.01);
(Continued)

(58) Field of Classification Search
CPC ........ H01M 10/0525; H01M 10/0562; H01M 2004/027; H01M 2300/0071; H01M 4/382; H01M 4/485; H01M 4/582
See application file for complete search history.

(56) References Cited

U.S. PATENT DOCUMENTS

2013/0071745 A1 3/2013 Mun et al.
2017/0317337 A1 11/2017 Hayashi et al.
(Continued)

OTHER PUBLICATIONS

Chen, H., Wong, L.L. and Adams, S. (2019), SoftBV—a software tool for screening the materials genome of inorganic fast ion conductors. Acta Cryst. B, 75: 18-33.

*Primary Examiner* — Victoria H Lynch
(74) *Attorney, Agent, or Firm* — Young Basile Hanlon & MacFarlane, P.C.

(57) ABSTRACT

An all-solid-state battery comprises a lithium anode, a cathode, solid electrolyte and a protective layer between the solid electrolyte and the lithium anode. The protective layer comprises an ion-conducting material having an electrochemical stability window against lithium of at least 1.0 V, a lowest electrochemical stability being 0.0 V and a highest electrochemical stability being greater than 1.0 V. More particularly, when the solid electrolyte is LiSiCON, the electrochemical stability window is at least 1.5 V, the lowest electrochemical stability is 0.0 V and the highest electrochemical stability is greater than 1.5 V. When the solid electrolyte is sulfide-based, the electrochemical stability window is at least 2.0 V, the lowest electrochemical stability is 0.0 V and the highest electrochemical stability is greater than 2.0 V.

7 Claims, 1 Drawing Sheet

(51) Int. Cl.
*H01M 4/38* (2006.01)
*H01M 4/485* (2010.01)
*H01M 10/0562* (2010.01)
*H01M 4/02* (2006.01)

(52) U.S. Cl.
CPC ... *H01M 10/0525* (2013.01); *H01M 10/0562* (2013.01); *H01M 2004/027* (2013.01); *H01M 2300/0071* (2013.01)

(56) References Cited

U.S. PATENT DOCUMENTS

| | | |
|---|---|---|
| 2018/0316015 A1 | 11/2018 | Lee et al. |
| 2019/0088991 A1* | 3/2019 | Hegde ................ H01M 4/366 |
| 2020/0075960 A1 | 3/2020 | Wachsman et al. |
| 2022/0006126 A1* | 1/2022 | Okuda ................ H01M 50/105 |
| 2022/0255119 A1 | 8/2022 | Kuwata et al. |

* cited by examiner

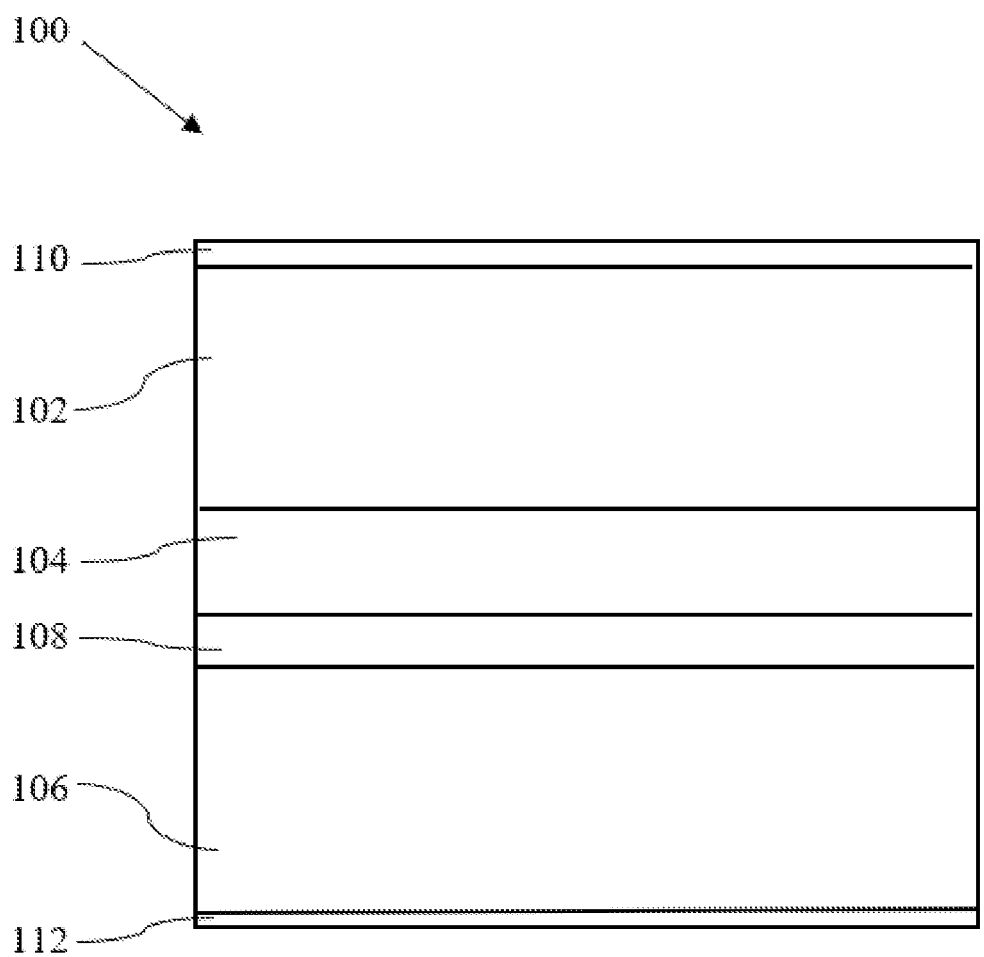

ANODE INTERLAYER FOR LITHIUM BATTERIES

TECHNICAL FIELD

This disclosure relates to lithium batteries having a protective layer comprising one or more material possessing high ionic conductivity, a wide electrochemical stability window, stability against lithium, and inertness to environmental elements.

BACKGROUND

Advances have been made toward high energy density batteries, including both lithium metal and lithium-ion batteries. However, these advances are limited by the underlying choice of materials and electrochemistry. Traditional lithium-ion batteries either use organic liquid electrolytes, prone to negative reactions with active materials and potentially flammable, or ionic liquid electrolytes, with increased viscosities and lower ionic conductivity. All-solid-state batteries (ASSB) can address some or all of these issues, as well as produce higher energy densities. However, the solid electrolytes used in ASSBs can have poor ionic conductivity and electrochemical stability, can be unstable with lithium, and may react with environmental elements such as water and air.

SUMMARY

Disclosed herein are implementations of a protective layer for all-solid-state batteries, the protective layer possessing high ionic conductivity, a wide electrochemical stability window, stability against lithium, and inertness to environmental elements. Also disclosed are all-solid-state battery cells and all-solid-state batteries including the protective layer implementations.

One implementation of an all-solid-state battery as disclosed herein comprises an anode comprising lithium, a cathode comprising a cathode active material, a solid electrolyte, and a protective layer between the solid electrolyte and the anode active material. The protective layer comprises an ion-conducting material having an electrochemical stability window against lithium of at least 1.0 V, a lowest electrochemical stability being 0.0 V and a highest electrochemical stability being greater than 1.0 V, the ion-conducting material selected from the group consisting of: $Cs_2Li_3I_5$; $Cs_2LiBr_3$; $Cs_2LiCl_3$; $Cs_2LiI_3$; $Cs_3Li_2Br_5$; $Cs_3Li_2Cl_5$; $Cs_3Li_2I_5$; $Cs_3LiBr_4$; $Cs_3LiCl_4$; $Cs_3LiI_4$; $CsLi_2Br_3$; $CsLi_2Cl_3$; $CsLi_2I_3$; $CsLi_3Br_4$; $CsLi_3Cl_4$; $CsLi_3I_4$; $CsLiBr_2$; $CsLiCl_2$; $CsLiI_2$; KLiTe; $Li_{14}Cr_2N_8O$; $Li_2CeN_2$; $Li_2CN_2$; $Li_2HfN_2$; $Li_2IBr$; $Li_2La_4O_7$; $Li_2Se$; $Li_2Te$; $Li_2ZrN_2$; $Li_3LaO_3$; $Li_4HfO_4$; $Li_5Cl_3O$; $Li_5LaO_4$; $Li_5ReN_4$; $Li_6CrN_4$; $Li_6Hf_2O_7$; $Li_6MoN_4$; $Li_7Br_3O_2$; $Li_7La_3Hf_2O_{12}$; $Li_7VN_4$; $Li_8HfO_6$; LiBr; $LiCa_4(BN_2)_3$; LiCaAs; $LiDyO_2$; $LiErO_2$; $LiEu_4(BN_2)_3$; $LiHoO_2$; $LiLaO_2$; LiLaSO; $LiLuO_2$; $LiNdO_2$; $LiPrO_2$; $LiTbO_2$; LiTiNCl; $LiYO_2$; NaLiICl; $RbLiBr_2$; $RbLiCl_2$; $Sr_2LiCBr_3N_2$; and $Sr_4Li(BN_2)_3$.

In some implementations, the solid electrolyte can be an oxide-based solid electrolyte. For example, the oxide-based solid electrolyte can be LiPON.

In some implementations, the protective layer is comprised of an ion-conducting material having an electrochemical stability window against lithium of at least 1.5 V, with the lowest electrochemical stability being 0.0 V and the highest electrochemical stability being greater than 1.5 V, the ion-conducting material selected from the group consisting of: $Cs_2Li_3I_5$; $Cs_2LiBr_3$; $Cs_2LiCl_3$; $Cs_2LiI_3$; $Cs_3Li_2Br_5$; $Cs_3Li_2Cl_5$; $Cs_3Li_2I_5$; $Cs_3LiBr_4$; $Cs_3LiCl_4$; $Cs_3LiI_4$; $CsLi_2Br_3$; $CsLi_2Cl_3$; $CsLi_2I_3$; $CsLi_3Br_4$; $CsLi_3Cl_4$; $CsLi_3I_4$; $CsLiBr_2$; $CsLiCl_2$; $CsLiI_2$; KLiTe; $Li_2CN_2$; $Li_2IBr$; $Li_2La_4O_7$; $Li_2Se$; $Li_2Te$; $Li_3LaO_3$; $Li_4HfO_4$; $Li_5Cl_3O$; $Li_5LaO_4$; $Li_5ReN_4$; $Li_6Hf_2O_7$; $Li_7Br_3O_2$; $Li_7La_3Hf_2O_{12}$; $Li_8HfO_6$; LiBr; $LiDyO_2$; $LiErO_2$; $LiEu_4(BN_2)_3$; $LiHoO_2$; $LiLaO_2$; LiLaSO; $LiLuO_2$; $LiNdO_2$; $LiPrO_2$; $LiTbO_2$; LiTiNCl; $LiYO_2$; NaLiICl; $RbLiBr_2$; $RbLiCl_2$; $Sr_2LiCBr_3N_2$; and $Sr_4Li(BN_2)_3$.

In some implementations, the solid electrolyte can be an oxide-based solid electrolyte. For example, the oxide-based solid electrolyte can be LiSiCON.

In some implementations, the protective layer comprises an ion-conducting material having the electrochemical stability window against lithium of at least 2.0 V, with the lowest electrochemical stability being 0.0 V and the highest electrochemical stability being 2.0 V, the ion-conducting material selected from the group consisting of: $CsLiCl_2$; $CsLiBr_2$; $CsLiI_2$; $CsLi_2Cl_3$; $CsLi_2Br_3$; $CsLi_2I_3$; $CsLi_3Cl_4$; $CsLi_3Br_4$; $CsLi_3I_4$; $Cs_2LiCl_3$; $Cs_2LiBr_3$; $Cs_2Li_3I_5$; $Cs_3LiCl_4$; $Cs_3LiBr_4$; $Cs_3LiI_4$; $Cs_3Li_2Cl_5$; $Cs_3Li_2Br_5$; $Cs_3Li_2I_5$; $LiLaO_2$; $LiDyO_2$; $LiLuO_2$; $LiErO_2$; $LiNdO_2$; $LiHoO_2$; $LiTbO_2$; $LiPrO_2$; $LiYO_2$; LiLaSO; $Li_2La_4O_7$; $Li_3LaO_3$; $Li_4HfO_4$; $Li_5Cl_3O$; $Li_5LaO_4$; $Li_6Hf_2O_7$; $Li_7Br_3O_2$; $Li_7La_3Hf_2O_{12}$; $Li_8HfO_6$; $Li_2CN_2$; $LiEu_4(BN_2)_3$; $Sr_4Li(BN_2)_3$; $Sr_2LiCBr_3N_2$; LiTiNCl; $RbLiCl_2$; $RbLiBr_2$; NaLiICl; and $Li_2IBr$.

In some implementations, the solid electrolyte is a sulfide-based electrolyte.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1 is a cross-section schematic view of a lithium battery cell as disclosed herein.

DETAILED DESCRIPTION

Traditional lithium-ion batteries typically use either organic liquid electrolytes, prone to safety issues, or highly viscous ionic liquid electrolytes, that have lower ionic conductivity. Furthermore, the conventional choice of graphite-based anodes limits the specific energy of the battery to less than 300 Wh/kg. An ASSB with a lithium metal anode and a solid electrolyte can address both the safety issues as well as the demand for higher energy densities over a wider operating temperature range. The lithium metal anode has a theoretical gravimetric capacity approximately ten times higher than graphite-based anodes. However, the large interfacial resistance at the electrolyte/electrode interface and the interfacial stability and compatibility affect the electrochemical performance of batteries.

Disclosed herein is a protective layer for ASSBs, the protective layer positioned between the solid electrolyte and the anode, the protective layer comprising an ion-conducting material selected based on the following material characteristics: ionic migration; a wide electrochemical stability window against lithium; stability against lithium metal; and inertness to environmental elements like water and air. The protective layer reduces the interfacial resistance at the electrolyte/anode interface, increases interfacial stability and compatibility and provides high ionic conductivity.

An ASSB cell 100 is illustrated schematically in cross-section in FIG. 1. The ASSB cell 100 of FIG. 1 is configured as a layered battery cell that includes as active layers a cathode active material layer 102, a solid electrolyte 104, and an anode active material layer 106. A protective layer 108 as disclosed herein is between the anode active material layer 106 and the solid electrolyte 104. In addition to the active layers, the lithium battery cell 100 of FIG. 1 may include a cathode current collector 110 and an anode current collector 112, configured such that the active layers are interposed between the anode current collector 112 and the cathode current collector 110. In such a configuration, the cathode current collector 110 is adjacent to the cathode active material layer 102, and the anode current collector 112 is adjacent to the anode active material layer 106. An ASSB can be comprised of multiple ASSB cells 100.

The anode active material in the anode active material layer 106 can be a layer of elemental lithium metal, a layer of a lithium compound(s) or a layer of doped lithium. The anode current collector 112 can be, as a non-limiting example, a sheet or foil of copper, nickel, a copper-nickel alloy, carbon paper, or graphene paper.

The solid electrolyte 104 can be, as non-limiting examples, sulfide compounds (e.g. Argyrodite, LGPS, LPS, etc.), garnet structure oxides (e.g. LLZO with various dopants), NASICON-type phosphate glass ceramics (LAGP), oxynitrides (e.g. lithium phosphorus oxynitride or LIPON), and polymers (PEO).

The cathode current collector 110 can be, as a non-limiting example, an aluminum sheet or foil, carbon paper or graphene paper.

The cathode active material layer 102 has cathode active material that can include one or more lithium transition metal oxides and lithium transition metal phosphates which can be bonded together using binders and optionally conductive fillers such as carbon black. Lithium transition metal oxides and lithium transition metal phosphates can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xCo_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$. The cathode active material layer 102 can be a sulfur-based active material and can include $LiSO_2$, $LiSO_2Cl_2$, $LiSOCl_2$, and $LiFeS_2$, as non-limiting examples.

The protective layer 108 between the solid electrolyte 104 and the anode active material 106 comprises one or more ion-conducting material having an electrochemical stability window against lithium of at least 1.0 V, a lowest electrochemical stability being 0.0 V and a highest electrochemical stability being greater than 1.0 V, the ion-conducting material selected from the group consisting of: $Cs_2Li_3I_5$; $Cs_2LiBr_3$; $Cs_2LiCl_3$; $Cs_2LiI_3$; $Cs_3Li_2Br_5$; $Cs_3Li_2Cl_5$; $Cs_3Li_2I_5$; $Cs_3LiBr_4$; $Cs_3LiCl_4$; $Cs_3LiI_4$; $CsLi_2Br_3$; $CsLi_2Cl_3$; $CsLi_2I_3$; $CsLi_3Br_4$; $CsLi_3Cl_4$; $CsLi_3I_4$; $CsLiBr_2$; $CsLiCl_2$; $CsLiI_2$; KLiTe; $Li_{14}Cr_2N_8O$; $Li_2CeN_2$; $Li_2CN_2$; $Li_2HfN_2$; $Li_2IBr$; $Li_2La_4O_7$; $Li_2Se$; $Li_2Te$; $Li_2ZrN_2$; $Li_3LaO_3$; $Li_4HfO_4$; $Li_5Cl_3O$; $Li_5LaO_4$; $Li_5ReN_4$; $Li_6CrN_4$; $Li_6Hf_2O_7$; $Li_6MoN_4$; $Li_7Br_3O_2$; $Li_7La_3Hf_2O_{12}$; $Li_7VN_4$; $Li_8HfO_6$; LiBr; $LiCa_4(BN_2)_3$; LiCaAs; $LiDyO_2$; $LiErO_2$; $LiEu_4(BN_2)_3$; $LiHoO_2$; $LiLaO_2$; LiLaSO; $LiLuO_2$; $LiNdO_2$; $LiPrO_2$; $LiTbO_2$; LiTiNCl; $LiYO_2$; NaLiICl; $RbLiBr_2$; $RbLiCl_2$; $Sr_2LiCBr_3N_2$; and $Sr_4Li(BN_2)_3$.

The group of ion-conducting material meet the following criteria. Each has an electrochemical stability window against lithium of at least 1.0 V or wider, with a lowest electrochemical stability being 0.0 V and a highest electrochemical stability being greater than 1.0 V. Each is stable with lithium. Each has an estimated lithium-ion migration energy of under 1.0 eV.

The electrochemical stability window of a material is the voltage range in which it is neither oxidized nor reduced. It is measured by subtracting the reduction potential from the oxidation potential. The grand potential phase diagram approach using the density-functional theory (DFT) was used to calculate the electrochemical stability window of materials against lithium. Lithium grand potential phase diagrams represent phase equilibria that are open to lithium, which is relevant when the material is in contact with a reservoir of lithium. The electrochemical stability window of a material is the voltage range in which no lithiation or delithiation occurs, i.e. where lithium uptake is zero. The ion-conducting materials herein each has an electrochemical stability window with lithium at least as wide as 1.0 V, with a lowest electrochemical stability being 0.0 V and a highest electrochemical stability being greater than 1.0 V.

Stability against lithium metal represents a material's inertness to lithium. A material is said to be stable if it does not undergo spontaneous reaction with lithium at 0 V. Materials that are stable against lithium have a reduction potential (vs. lithium) at or near 0 V. The ion-conducting materials herein are stable or near stable against lithium.

Ionic conductivity is the property most often used to study ionic migration in solids. The ionic conductivity of a solid measures how easily an ion can move from one site to another through defects in the crystal lattice. While ionic conductivity clearly depends on the crystal structure, it is also influenced by the microstructure that emerges from the processing of the solid. To work with a material property that is independent of processing conditions, lithium-ion migration energy, i.e., the lithium-ion migration barrier, is used as a measure of the ionic migration of lithium compounds.

The 1D barrier measures the lowest energy required by a diffusion species to hop between two opposite faces of a unit cell, in any one of the three directions. The 2D barrier and 3D barrier, correspondingly, measure the lowest energies required to hop between opposite faces in any two or all three directions, respectively. The 1D barrier≤2D barrier≤3D barrier for all solids. The lowest activation energy required to connect every point on the pathway is the 3D migration barrier, and it can provide a quantitative measure of the maximum achievable ionic conductivity. The 1D, 2D, and 3D migration barriers, in general, depend on the dimensionality of the pathway available for lithium conduction in a material. For isotropic materials, where conduction is equally fast in all three dimensions, the three barriers are similar. In such cases, the 3D barrier turns out to be a good estimate of the expected ionic conductivity. In these cases, the 3D barrier is used as an effective barrier. However, many materials have predominant 2D conduction pathways, or in some cases, predominant 1D conduction pathways. In these materials, the 1D/2D barriers can be significantly smaller than the 3D barrier. To account for such cases, the effective barrier is set as either the 1D barrier or the 2D barrier depending on how different they are in magnitude. The ion-conducting materials herein have a low migration barrier, having an estimated migration barrier, or estimated lithium-ion migration energy, of 0.9 eV or less.

Table One includes the lowest electrochemical stability and the highest electrochemical stability of the materials disclosed herein, along with the estimated migration barrier of the materials.

The protective layer 106 disclosed herein can be used with any solid electrolyte material known to those skilled in the art. As non-limiting examples, the solid electrolyte 104 can be and oxide-based solid electrolyte or a sulfide-based solid electrolyte. Examples of oxide-based electrolytes include LiPON and LiSiCON.

Each of the protective layer and the solid electrolyte have a potential window. The potential window of the protective layer dictates what type of electrolyte can be used and visa versa. The stable oxidation potential of the protective layer and the stable reduction potential of the solid electrolyte should overlap to prevent other reactions at this interface. Because LiSiCON, for example, starts to reduce at 1.5 V, in some implementations the protective layer is comprised of an ion-conducting material having an electrochemical stability window against lithium of at least 1.5 V, with the lowest electrochemical stability being 0.0 V and the highest electrochemical stability being greater than 1.5 V, the ion-conducting material selected from the group consisting of: $Cs_2Li_3I_5$; $Cs_2LiBr_3$; $Cs_2LiCl_3$; $Cs_2LiI_3$; $Cs_3Li_2Br_5$; $Cs_3Li_2Cl_5$; $Cs_3Li_2I_5$; $Cs_3LiBr_4$; $Cs_3LiCl_4$; $Cs_3LiI_4$; $CsLi_2Br_3$; $CsLi_2Cl_3$; $CsLi_2I_3$; $CsLi_3Br_4$; $CsLi_3Cl_4$; $CsLi_3I_4$; $CsLiBr_2$; $CsLiCl_2$; $CsLiI_2$; KLiTe; $Li_2CN_2$; $Li_2IBr$; $Li_2La_4O_7$; $Li_2Se$; $Li_2Te$; $Li_3LaO_3$; $Li_4HfO_4$; $Li_5Cl_3O$; $Li_5LaO_4$; $Li_5ReN_4$; $Li_6Hf_2O_7$; $Li_7Br_3O_2$; $Li_7La_3Hf_2O_{12}$; $Li_8HfO_6$; LiBr; $LiDyO_2$; $LiErO_2$; $LiEu_4(BN_2)_3$; $LiHoO_2$; $LiLaO_2$; LiLaSO; $LiLuO_2$; $LiNdO_2$; $LiPrO_2$; $LiTbO_2$; LiTiNCl; $LiYO_2$; NaLiICl; $RbLiBr_2$; $RbLiCl_2$; $Sr_2LiCBr_3N_2$; and $Sr_4Li(BN_2)_3$.

Sulfide-based solid electrolytes can be preferable for ASSBs because of their high ionic conductivity and good softness and elasticity. However, sulfides can be reactive, leading to a reduction in the stability of the electrolyte interface. Sulfide-based electrolytes can start to reduce at 2.0 V. In some implementations, the protective layer comprises an ion-conducting material having the electrochemical stability window against lithium of at least 2.0 V, with the lowest electrochemical stability being 0.0 V and the highest electrochemical stability being 2.0 V, the ion-conducting material selected from the group consisting of: $CsLiCl_2$; $CsLiBr_2$; $CsLiI_2$; $CsLi_2Cl_3$; $CsLi_2Br_3$; $CsLi_2I_3$; $CsLi_3Cl_4$; $CsLi_3Br_4$; $CsLi_3I_4$; $Cs_2LiCl_3$; $Cs_2LiBr_3$; $Cs_2LiI_3$; $Cs_3LiCl_4$; $Cs_3LiBr_4$; $Cs_3LiI_4$; $Cs_3Li_2Cl_5$; $Cs_3Li_2Br_5$; $Cs_3Li_2I_5$; $LiLaO_2$; $LiDyO_2$; $LiLuO_2$; $LiErO_2$; $LiNdO_2$; $LiHoO_2$; $LiTbO_2$; $LiPrO_2$; $LiYO_2$; LiLaSO; $Li_2La_4O_7$; $Li_3LaO_3$; $Li_4HfO_4$; $Li_5Cl_3O$; $Li_5LaO_4$; $Li_6Hf_2O_7$; $Li_7Br_3O_2$; $Li_7La_3Hf_2O_{12}$; $Li_8HfO_6$; $Li_2CN_2$; $LiEu_4(BN_2)_3$; $Sr_4Li(BN_2)_3$; $Sr_2LiCBr_3N_2$; LiTiNCl; $RbLiCl_2$; $RbLiBr_2$; NaLiICl; and $Li_2IBr$. The ion-conducting materials in this group have a low migration barrier, having an estimated migration barrier, or estimated lithium-ion migration energy, of 0.8 eV or less.

TABLE 1

| Materials | Estimated Barrier | Lowest Electrochemical Stability | Highest Electrochemical Stability |
|---|---|---|---|
| $Cs_2Li_3I_5$ | 0.540 | 0 | 2.353 |
| $Cs_2LiBr_3$ | 0.230 | 0 | 2.969 |
| $Cs_2LiCl_3$ | 0.105 | 0 | 4.265 |
| $Cs_2LiI_3$ | 0.335 | 0 | 2.353 |
| $Cs_3Li_2Br_5$ | 0.109 | 0 | 2.969 |
| $Cs_3Li_2Cl_5$ | 0.189 | 0 | 4.265 |

TABLE 1-continued

| Materials | Estimated Barrier | Lowest Electrochemical Stability | Highest Electrochemical Stability |
|---|---|---|---|
| $Cs_3Li_2I_5$ | 0.202 | 0 | 2.353 |
| $Cs_3LiBr_4$ | 0.509 | 0 | 2.969 |
| $Cs_3LiCl_4$ | 0.148 | 0 | 4.265 |
| $Cs_3LiI_4$ | 0.263 | 0 | 2.353 |
| $CsLi_2Br_3$ | 0.774 | 0 | 2.969 |
| $CsLi_2Cl_3$ | 0.254 | 0 | 4.265 |
| $CsLi_2I_3$ | 0.194 | 0 | 2.353 |
| $CsLi_3Br_4$ | 0.392 | 0 | 2.969 |
| $CsLi_3Cl_4$ | 0.455 | 0 | 4.255 |
| $CsLi_3I_4$ | 0.301 | 0 | 2.353 |
| $CsLiBr_2$ | 0.253 | 0 | 2.969 |
| $CsLiCl_2$ | 0.230 | 0 | 4.265 |
| $CsLiI_2$ | 0.246 | 0 | 2.353 |
| KLiTe | 0.372 | 0 | 1.560 |
| $Li_{14}Cr_2N_8O$ | 0.606 | 0 | 1.195 |
| $Li_2CeN_2$ | 0.140 | 0 | 1.031 |
| $Li_2CN_2$ | 0.518 | 0 | 2.085 |
| $Li_2HfN_2$ | 0.329 | 0 | 1.083 |
| $Li_2IBr$ | 0.291 | 0 | 2.471 |
| $Li_2La_4O_7$ | 0.072 | 0 | 2.913 |
| $Li_2Se$ | 0.327 | 0 | 1.895 |
| $Li_2Te$ | 0.508 | 0 | 1.566 |
| $Li_2ZrN_2$ | 0.330 | 0 | 1.113 |
| $Li_3LaO_3$ | 0.193 | 0 | 2.914 |
| $Li_4HfO_4$ | 0.373 | 0 | 2.914 |
| $Li_5Cl_3O$ | 0.701 | 0 | 2.799 |
| $Li_5LaO_4$ | 0.401 | 0 | 2.914 |
| $Li_5ReN_4$ | 0.824 | 0 | 1.552 |
| $Li_6CrN_4$ | 0.663 | 0 | 1.195 |
| $Li_6Hf_2O_7$ | 0.782 | 0 | 3.228 |
| $Li_6MoN_4$ | 0.814 | 0 | 1.321 |
| $Li_7Br_3O_2$ | 0.533 | 0 | 2.914 |
| $Li_7La_3Hf_2O_{12}$ | 0.470 | 0 | 2.914 |
| $Li_7VN_4$ | 0.410 | 0 | 1.077 |
| $Li_8HfO_6$ | 0.313 | 0 | 2.914 |
| LiBr | 0.350 | 0 | 3.147 |
| $LiCa_4(BN_2)_3$ | 0.336 | 0 | 1.383 |
| LiCaAs | 0.562 | 0 | 1.003 |
| $LiDyO_2$ | 0.361 | 0 | 3.010 |
| $LiErO_2$ | 0.428 | 0 | 3.010 |
| $LiEu_4(BN_2)3$ | 0.694 | 0 | 2.474 |
| $LiHoO_2$ | 0.381 | 0 | 2.979 |
| $LiLaO_2$ | 0.354 | 0 | 2.914 |
| LiLaSO | 0.459 | 0 | 2.002 |
| $LiLuO_2$ | 0.520 | 0 | 3.195 |
| $LiNdO_2$ | 0.434 | 0 | 2.914 |
| $LiPrO_2$ | 0.896 | 0 | 2.914 |
| $LiTbO_2$ | 0.369 | 0 | 2.981 |
| LiTiNCl | 0.287 | 0 | 2.494 |
| $LiYO_2$ | 0.411 | 0 | 2.936 |
| NaLiICl | 0.566 | 0 | 2.601 |
| $RbLiBr_2$ | 0.376 | 0 | 3.147 |
| $RbLiCl_2$ | 0.703 | 0 | 4.255 |
| $Sr_2LiCBr_3N_2$ | 0.548 | 0 | 2.162 |
| $Sr_4Li(BN_2)_3$ | 0.109 | 0 | 3.036 |

Unless otherwise defined, all technical and scientific terms used have the same meaning as commonly understood by one of ordinary skill in the art to which the claimed subject matter belongs. The terminology used in this description is for describing particular embodiments only and is not intended to be limiting. As used in the specification and appended claims, the singular forms "a," "an," and "the" are intended to include the plural forms as well, unless the context clearly indicates otherwise.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An all-solid-state battery, comprising:
   an anode comprising lithium;
   a cathode comprising a cathode active material;
   a solid electrolyte, wherein the solid electrolyte is LiPON; and
   a protective layer between the solid electrolyte and the anode, the protective layer comprising an ion-conducting material having an electrochemical stability window against lithium of at least 1.0 V, a lowest electrochemical stability being 0.0 V, a highest electrochemical stability being greater than 1.0 V, and an estimated migration barrier with lithium of less than 0.33 eV, the ion-conducting material selected from the group consisting of: $Cs_2LiBr_3$; $Cs_2LiCl_3$; $Cs_3Li_2Br_5$; $Cs_3Li_2Cl_5$; $Cs_3Li_2I_5$; $Cs_3LiCl_4$; $Cs_3LiI_4$; $CsLi_2Cl_3$; $CsLi_2I_3$; $CsLi_3I_4$; $CsLiBr_2$; $CsLiCl_2$; $CsLiI_2$; $Li_2CeN_2$; $Li_2HfN_2$; $Li_2IBr$; $Li_2La_4O_7$; $Li_2Se$; $Li_3LaO_3$; $Li_8HfO_6$; LiTiNCl; and $Sr_4Li(BN_2)_3$.

2. The all-solid-state battery of claim 1, wherein the solid electrolyte is a sulfide-based solid electrolyte.

3. An all-solid-state battery, comprising:
   an anode comprising lithium;
   a cathode comprising a cathode active material;
   an oxide-based solid electrolyte; and
   a protective layer between the oxide-based solid electrolyte and the anode, the protective layer comprising an ion-conducting material having an electrochemical stability window against lithium of at least 1.0 V, a lowest electrochemical stability being 0.0 V and a highest electrochemical stability being greater than 1.0 V, the ion-conducting material being a non-binary lithium and a halide containing material comprising one or more of: $Cs_2Li_3I_5$; $Cs_2LiBr_3$; $Cs_2LiCl_3$; $Cs_2LiI_3$; $Cs_3Li_2Br_5$; $Cs_3Li_2Cl_5$; $Cs_3Li_2I_5$; $Cs_3LiBr_4$; $Cs_3LiCl_4$; $Cs_3LiI_4$; $CsLi_2Br_3$; $CsLi_2Cl_3$; $CsLi_2I_3$; $CsLi_3Br_4$; $CsLi_3Cl_4$; $CsLi_3I_4$; $CsLiBr_2$; $CsLiCl_2$; $CsLiI_2$; $Li_2IBr$; LiTiNCl; NaLiICl; $RbLiBr_2$; or $RbLiCl_2$.

4. The all-solid-state battery of claim 3, wherein the oxide-based solid electrolyte is LiPON.

5. The all-solid-state battery of claim 3, wherein the ion-conducting material has the electrochemical stability window against lithium of at least 2.5 V, with the highest electrochemical stability being greater than 2.5 V, the ion-conducting material comprising one or more of: $Cs_2LiBr_3$; $Cs_2LiCl_3$; $Cs_3Li_2Br_5$; $Cs_3Li_2Cl_5$; $Cs_3LiBr_4$; $Cs_3LiCl_4$; $CsLi_2Br_3$; $CsLi_2Cl_3$; $CsLi_3Br_4$; $CsLi_3Cl_4$; $CsLiBr_2$; $CsLiCl_2$; NaLiICl; $RbLiBr_2$; or $RbLiCl_2$.

6. The all-solid-state battery of claim 5, wherein the oxide-based solid electrolyte is LiSiCON.

7. An all-solid-state battery, comprising:
   an anode comprising lithium;
   a cathode comprising a cathode active material;
   a sulfide-based solid electrolyte; and
   a protective layer between the sulfide-based solid electrolyte and the anode, the protective layer comprising an ion-conducting material having an electrochemical stability window against lithium of at least 1.0 V, a lowest electrochemical stability being 0.0 V, a highest electrochemical stability being greater than 1.0 V, and an estimated migration barrier with lithium of less than 0.33 eV, the ion-conducting material being a ternary compound selected from the group consisting of: $Cs_2LiBr_3$; $Cs_2LiCl_3$; $Cs_3Li_2Br_5$; $Cs_3Li_2Cl_5$; $Cs_3Li_2I_5$; $Cs_3LiCl_4$; $Cs_3LiI_4$; $CsLi_2Cl_3$; $CsLi_2I_3$; $CsLi_3I_4$; $CsLiBr_2$; $CsLiCl_2$; $CsLiI_2$; $Li_2CeN_2$; $Li_2HfN_2$; $Li_2IBr$; $Li_2La_4O_7$; $Li_3LaO_3$; $Li_8HfO_6$; and LiTiNCl.

* * * * *